Dec. 5, 1944.   H. D. FOSTER ET AL   2,364,435
MANUFACTURE OF FILMS
Filed Nov. 4, 1941   2 Sheets-Sheet 1

INVENTORS
Henry D. Foster
Arthur W. Larchar
BY Ralph F. Miller
ATTORNEY

Dec. 5, 1944.　　　H. D. FOSTER ET AL　　　2,364,435
MANUFACTURE OF FILMS
Filed Nov. 4, 1941　　　2 Sheets-Sheet 2

INVENTORS
Henry D. Foster
Arthur W. Larchar
BY Ralph F. Miller
ATTORNEY

Patented Dec. 5, 1944

2,364,435

UNITED STATES PATENT OFFICE 2,364,435

MANUFACTURE OF FILMS

Henry D. Foster, Wilmington, Del., and Arthur W. Larchar, Mendenhall, Pa., assignors to E. I. du Pont de Nemours & Company, Wilmington, Del., a corporation of Delaware Application November 4, 1941, Serial No. 417,864

11 Claims. (Cl. 18—15)

This invention relates to the manufacture of films and more particularly to an improved method for melt-casting films of fusible polymers.

The present invention is applicable to the production of films from polymeric materials capable of being melt-cast into smooth films, but is especially useful in the production of films from the synthetic linear polymers described in U. S. Patent 2,071,250 and particularly from the polyamides described in U. S. Patents 2,071,253 and 2,130,948.

These polymers are obtainable from a variety of materials capable of polymerization to linear polymers of high molecular weight. The high molecular weight required for the best fiber-forming properties is obtained by continuing the polymerization until the intrinsic viscosity, defined as given in the last mentioned patent, is at least 0.4. The polymer can then be cold drawn (that is drawn under tension in the solid state) in the form of films, filaments, etc. to yield products of increased strength which show by X-ray examination molecular orientation in the direction of stress applied. The polyamides, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition. These polyamides can be obtained, for example, by self-polymerization of a monoamino-monocarboxylic acid, or by reacting a diamine with a dibasic carboxylic acid in substantially equimolecular amounts, it being understood that reference herein to the amino acids, diamines and dibasic carboxylic acids is intended to include the equivalent amide-forming derivatives of these reactants. In the polyamides obtained from these reactants, which as additional reactants can include glycol-dibasic acid mixtures or other linear polymer-forming reactants, the average number of carbon atoms separating the amide groups is at least two. On hydrolysis with hydrochloric acid the amino acid polymers yield the amino acid hydrochloride, and the diamine-dibasic acid polymers yield the diamine hydrochloride and the dibasic carboxylic acid.

Another type of linear polymer useful in the practice of this invention is the solid polymer of ethylene obtained under high pressures at moderate temperatures as described in U. S. Patent 2,153,553.

In the manufacture of films from the above and similar polymers, casting from solution tends to limit striations and streaks to some extent through self-leveling. But melt-casting is more economical because of the much shorter "set up" period and because of the absence of solvents. Furthermore in the case of many polymers no suitable solvents are known. A method, known as close-casting and described in U. S. Patent 2,212,770 has been developed for casting film from melt. In that method the extrusion slot is located very close to the moving support or drum which receives the extruded film. This short distance, less than three-sixteenths of an inch and usually within one thirty-second inch is maintained to obtain good contact between the drum and film and to prevent deformation of the molten film between the extrusion slot and the drum surface. This deformation is considerable since the extruded polymer necks rapidly as the distance from the slot to the support is increased. In this close-casting process the condition at the hopper must be relied upon to yield a film free from imperfections and streaks. It has been found, however, that unless the hopper-lips are machined and finished with very great care that numerous small longitudinal striations which are commonly known as hopper-lip streaks appear in the film. The striations, while not usually objectionable for uses such as wrapping films, are quite serious in the case of a photographic film base. There is scant time for self-leveling once the film is on the cold support since the molten polyamide must be cooled rapidly to a temperature well below (at least 60° C. below) the melting point of the polymer in order to secure clear films. In some cases, e. g. in the case of polyhexamethylene adipamide this degree of cooling must be attained in less than 0.2 of a second.

This invention has as an object a new and improved method and apparatus for melt-casting film. A further object is a method for obtaining films of synthetic linear polymer which are free from striations. Other objects will appear hereinafter.

The above objects are accomplished by an air leveling process in which the streaks are leveled during the passage of the molten stream through an air-gap between the extrusion slot and the moving support. The extrusion slot can be positioned above the moving support a distance substantially greater than that heretofore used, more than one-fourth of an inch in the present instance and preferably about one inch, and the molten film is prevented from necking down by supporting or guiding it in this gap by means of guides along each edge of the film which hold the film extended until it reaches the moving support.

The invention is more particularly described in connection with the accompanying drawings in which Fig. 1 is a side view in elevation and partly in section of mechanism for carrying out the invention;

Figure 2:
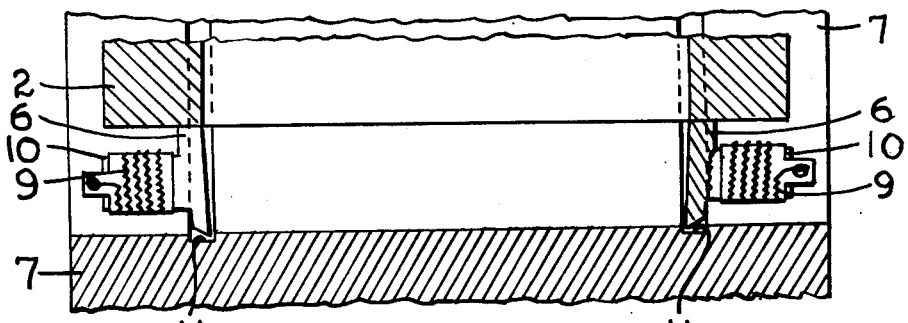
Fig. 2 is a front view in elevation of a portion of the moving support or drum and of a portion of the extrusion hopper with the film guides attached thereto.
Figure 3:
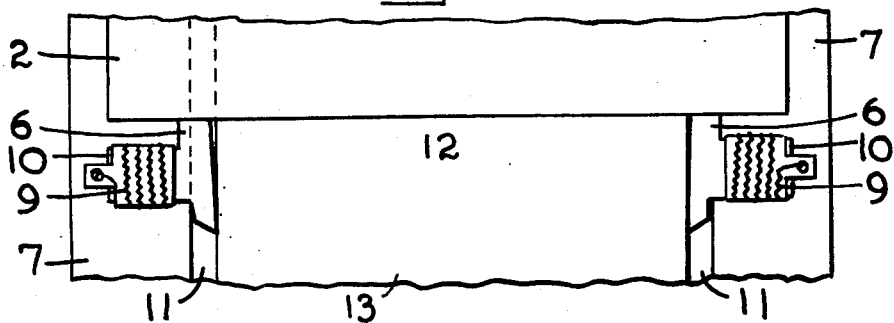
Fig. 3 is a front view similar to Fig. 2 showing the film passing between the guides to the drum.

The numerals 1 and 2 indicate the lips of an extrusion hopper shaped to form a slot opening 3 and a channel 4 above into which the molten polymer 5 is pumped. At the bottom of the lips 2 and at each end of the slot formed by the two lips there is located a downwardly extending guide 6 as shown in Figs. 2 and 3.

Figure 1:
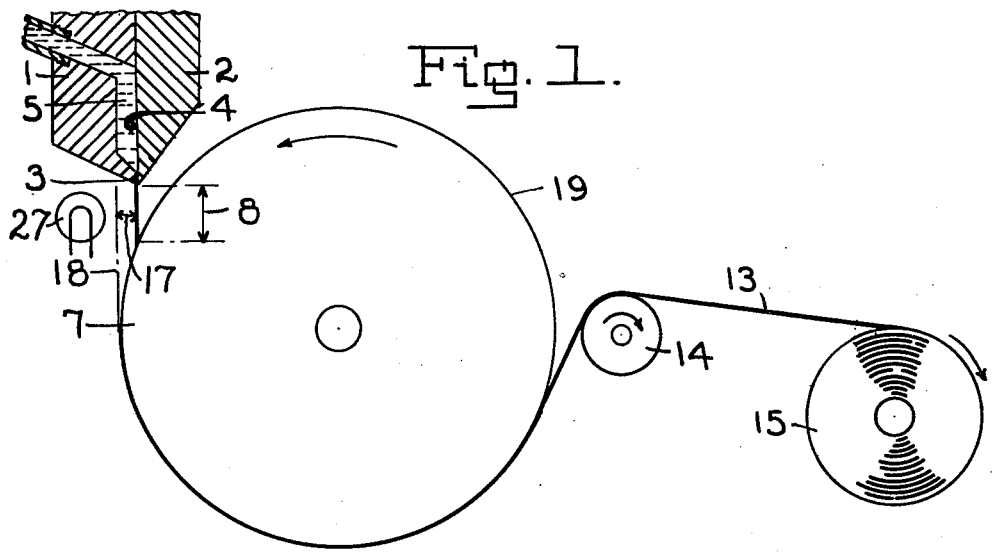

In order to show more clearly the position of the extrusion slot with regard to the casting wheel 7, which is described in more detail later, Fig. 1 has been shown with the guides 6 removed. The distance 8 of the slot from the casting wheel as referred to herein is not necessarily the shortest distance but is the distance traversed by the film in traveling from the slot to the casting wheel. In general this will be the vertical distance between the slot and the wheel.

The guides 6 are made of sheet metal, e. g. spring steel presenting an edge of about 0.014 thickness toward each edge of the film. They are positioned as illustrated in Figs. 2 and 3. The molten film of polymer is supported between the inner edges of the two guides. With reference to the above statement that the molten film is supported or guided in the air-gap by guides, it should be understood that the support offered by the guides is the force (presumably surface tension) operating at the interface between the guides and the molten film. This force operating at the guides supports the molten film in that it keeps the film extended to essentially its original width, which is approximately equal to the length of the extrusion slot.

The guides 6 are heated to prevent the polymer from freezing and collecting on them by electrically heated michrome resistance wire 9 suitably wound about the ears 10 protruding from the guides 6. As shown in Figs. 2 and 3, the lower ends of the guides extend into the spaced peripheral grooves 11 which are cut in the casting wheel.

The guides 6 taper inwardly slightly from the slot orifice to the width between the grooves 11 in the casting drum. It is to be observed that in the absence of the guides 6 the molten stream in the same distance would neck considerably. For example, with a three-fourths inch air-gap and the edges of the film supported by the guides the taper in one instance is from seven and seven-eighths inches at the top to seven and nine-sixteenths inches at the bottom. Without the guides and with a "draw down ratio" of 1:1 (i. e., the ratio of the peripheral speed of the drum to the linear speed of the polymer through the slot is 1:1), the molten polymer necks to a width of about six inches. When the draw down ratio is higher even more necking occurs. Although this invention is concerned primarily with an air leveling process requiring the guides, we have observed that with the large air-gap distances used in the practice of this invention and without the use of guides an unusual film or ribbon having edges thicker than the remainder of the film can be obtained. Thus with a one inch space below the slot and a drum speed giving about a 1:1 draw down ratio, a film with attractive, reinforced, bead-like edges is obtained. Products of this type can be used as apparel belts, suspenders, etc.

In Fig. 3 the numeral 12 indicates the molten portion of the film supported in the air-gap by the guides 6, and the numeral 13 indicates the portion of the film which has flowed on the surface of the stainless steel casting wheel 7 which is internally cooled with water by suitable means not shown. As shown in Fig. 1, the solidified, smooth, transparent film is continuously carried by the drum rotating in the direction indicated by the arrow to the take-off roll 14 where the film is stripped from the drum and travels to a wind-up roll 15.

Figure 4:
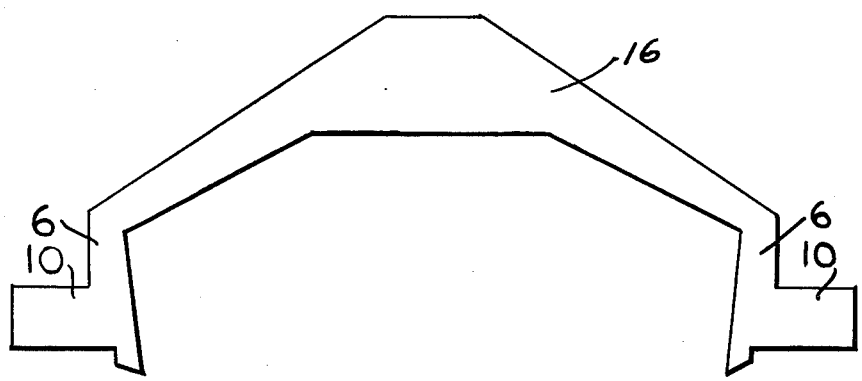
Fig. 4 is a front view in elevation of a convenient form of guides.

The guides can be held in place by any suitable means. They can be held in place independently of each other or they can be joined and held in place as a single unit. Fig. 4 illustrates a convenient form of guides in which the two guides 6 are joined by the connecting member 16 which serves to attach the guides to the hopper. The guides and the connecting member are cut from a single piece of spring steel. The connecting member is clamped between the two halves (lips) of the hopper. This does not interfere with the flow of polymer to the slot, for as indicated in Fig. 1, one half of the hopper has a recessed channel 4 through which the molten polymer is fed to the slot.

Figure 5:
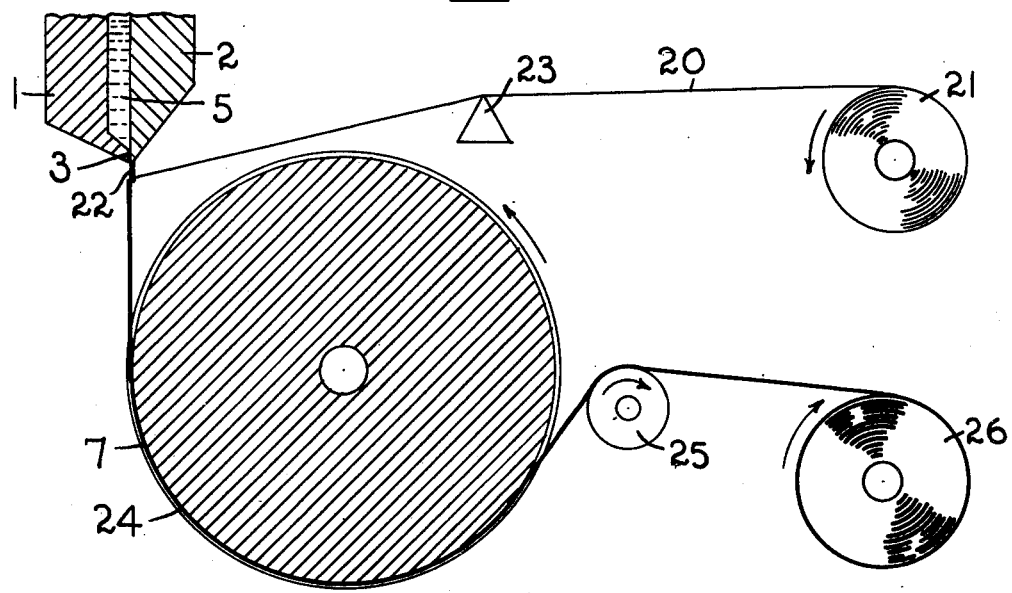
Fig. 5 is a diagrammatic side view of additional means for supporting the edges of the film.
Figure 6:
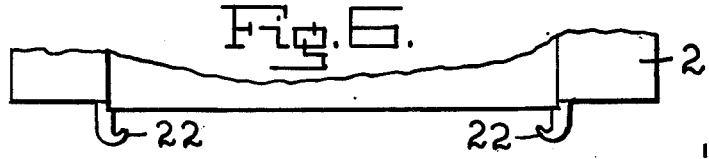
Fig. 6 is a detail view in elevation of the extrusion hopper of Fig. 5 with the thread guides attached thereto.

Various modifications can be made in the form and shape of the guides used along the edges of the film to hold it extended while it is traveling through the air-gap. In the modification shown in Fig. 5 moving threads travel along with the film. This procedure is quite effective when the draw down ratio is approximately 1:1. In the construction shown the threads 20 unwind from two spools, one of which is shown at 21. One of the hopper lips is provided at each end of the extrusion slot 3 with a guide hook 22 over which the threads are drawn from the guide 23 by the casting wheel 7 provided with grooves, one of which is indicated at 24 to accommodate the threads. The film, to which the threads are permanently attached at the edges after solidification of the film, passes from the wheel 7 over the guide roll 25 to a wind-up roll 26.

In order to obtain clear transparent films from the high molecular weight linear polyamides it is important that the polymer be well filtered, preferably through sand, and that the molten film be cooled as rapidly as possible from the temperature at which the polymer first begins to solidify to a temperature at least 60° C. below its melting point. It is advantageous to effect this cooling within one second; in fact, it is desirable to cool the polymer to at least 60° C. below its melting point within one second of the time the molten polymer strikes the moving support. This condition can be obtained by cooling the drum internally with circulating water to a temperature slightly above the dew point of the surrounding air. The condensation of moisture on the casting surface should be avoided since water and likewise many other liquids produce a haze on the surface of the film when they come in contact with it in the molten state. In the case of many polymers satisfactory results are obtained even when the moving support is moderately warm, e. g. 50° to 100° C.

In the best embodiment of the invention the casting is vertically downward with the plane of casting displaced in the direction towards the center of the drum a distance of less than one inch (numeral 17 in Fig. 1) from the parallel vertical plane tangent (indicated by the numeral 18) to the casting drum on the downward moving side of the drum. The preferred distance is about three-eighths inch from the tangent. The geometry of this preferred arrangement of casting requires that the casting drum be of relatively small diameter even for a full scale commercial unit. The optimum diameter does not exceed eighteen inches. Although the process can be operated with the hopper slot located either before or after the crown of the drum, the above mentioned arrangement best insures a steady state of flow of polymer through the air-gap and insures contact of the molten film with the casting drum in a straight line across the surface of the wheel without wandering or weaving back and forth. In this preferred arrangement the film undergoes no substantial change in direction on striking the drum and as a result there is no tendency for the molten film in the air-gap between the hopper and the drum to break away from the edge guides before striking the drum.

An air-gap up to four inches in length can be used. The optimum length is governed by the time required for the streaks to be leveled out of the molten film which is dependent on the particular polymer used and its viscosity. We have found, however, that it is more difficult to prevent the film from breaking away from the guides when they are longer than two inches and that usually most of the streaks which can be leveled out are eliminated within one inch of travel through the air. For this reason the length of the air-gap is preferably from three-eighths of an inch to two inches.

The edge of each guide supporting the film is heated by conduction of heat inward from the ears. The temperature is adjusted by varying the voltage across the resistance wire to a point just high enough to prevent excessive accumulation of polymer on the guides since this temperature is best suited to aid the guides in holding the film extended.

Since the rapid cooling necessary to produce clear films is brought about primarily by contact with the drum surface, it is important to have good contact between the film and the drum in order to secure the desired heat transfer. For this reason it is advantageous to apply agents to the surface of the drum which improve the contact between the drum and film and thus promote better heat transfer. These substances, which are best applied by an atomizer at the portion of the drum indicated by the numeral 19 and which will be referred to as contact agents, are insoluble in the polymer and are preferably organic substances of relatively high boiling point (above 125° C.); they are liquid at the temperature of the casting drum. Suitable materials are tricresyl phosphate, chlorinated diphenyls, mineral oils, kerosene, and xylene. These are sprayed onto the surface of the drum before the film is cast on it. It has been found that different contact agents are most suitable for different polymers, for example, ethyl alcohol is a quite satisfactory agent for the mentioned ethylene polymer but it causes a haze when used for polyhexamethylene adipamide.

The invention is further illustrated by the following examples in which the polymer after being molten was filtered through a bed of sand in all instances before being fed into the extrusion hopper.

*Example I*

The polyamide used was the interpolymer of hexamethylene diamine, adipic acid and sebacic acid obtained by the interpolymerization of 30 parts by weight of hexamethylenediammonium adipate and 70 parts by weight of hexamethylenediammonium sebacate. This polymer had a melt viscosity of approximately 300 poises at 285° C. The molten polymer (moisture content, 0.17%) was forced under pressure through an extrusion hopper having an 8" x 0.012" slot. The molten polymer traveled through a three-quarter inch air-gap onto an eight and one-half inch diameter internally cooled casting drum made from stainless steel having a smooth, highly polished surface. Guides for the edges of the film extended from the hopper into two one-sixteenth inch deep peripheral grooves cut in the drum. These guides made from spring steel were tapered in toward the bottom so that the distance between them at the top was seven and seven-eighths inches and that at the bottom was seven and nine-sixteenth inches. The peripheral speed of the casting drum was deliberately varied during the course of the casting from four to forty feet per minute and the polymer pumping rate was varied over a range sufficient to prepare film of thicknesses from one to thirty-five mils. A thin layer of kerosene was applied to the surface of the drum by spraying with an atomizer to serve as a contact agent. The film was extruded from the position and direction indicated in Fig. 1 (the distance indicated by 17 being three-eighths inch) and stripped from the drum on the opposite side. In this manner fifty pounds of clear, transparent film free of streaks were prepared. In this run the "draw down ratio," i. e., the ratio of the peripheral speed of the drum to the linear velocity of the polymer through the slot, was varied from 12:1 down to 1:3.

*Example II*

Polyhexamethylene sebacamide having a melt viscosity of 300 poises at 285° C. was pumped after melting filtering through an 8" x 0.014" slot. From the slot the polymer traveled through an air-gap of one and one-half inches onto a casting drum, the molten polymer being held extended by guides extending one and one-half inches downward from the edges of the slot. The guides were heated electrically and their temperature controlled with an auto-transformer. The direction of casting was vertical and the position was three-quarters of an inch back (towards center of drum) from the vertical plane tangential to the drum. Kerosene was applied as a contact agent as in Example I and the film stripped after being in contact with the drum for half a turn. Several hundred feet of streak-free transparent film five mils thick were prepared at a rate of twelve feet per minute using a draw down ratio of 3:1.

Example III

An interpolymer of hexamethylenediammonium adipate and hexamethylenediammonium sebacate having a melt viscosity of 72 poises at 275° C. was pumped through an extrusion hopper having a 2" x 0.011" slot spaced three-eighths of an inch above the top of the casting drum. The direction of extrusion made a 40° angle with the horizontal plane tangent to the top of the drum. Guides made of aluminum sheeting extended out seven-sixteenths of an inch from each end of the hopper slot and touched the top of the casting drum. In this case the direction of extrusion was neither vertical nor tangential but instead was at a 40° angle; the guides were not heated nor were they tapered in toward the bottom. The six and one-half inch diameter casting drum cooled by water circulating inside had a five inch face of highly polished stainless steel without the peripheral grooves mentioned in other examples. A film of kerosene was applied as a contact agent to the surface of the drum by hand with a cloth. The draw down ratio was 1:1. The film was stripped after traveling about three-quarters of the way around the drum. Clear, transparent films 0.012" thick which were smooth and practically free of streaks were prepared in this way.

Example IV

A polymer of ethylene obtained in the manner described in the previously mentioned patent and having a melt viscosity of 845 poises at 285° C. was made into film as follows: The polymer was melted at 285° C., pumped through a 2" x 0.010" slot, allowed to travel through a one inch air-gap onto a three and one-half inch diameter internally water cooled stainless steel drum. Heated edge guides extended one inch from the hopper into two one-sixteenth of an inch deep peripheral grooves cut in the five inch face of the drum. The direction of extrusion was vertical and in a position displaced one-half inch (toward the center of the drum) from the vertical plane tangential to the drum. Clear, smooth film was made at speeds from four to forty feet per minute and in thicknesses from 0.001" to 0.012". A thin layer of ethyl alcohol was spread over the surface of the drum in order to improve the contact between it and the film.

In the operation of this invention the thickness of the film is governed less by the width of the extrusion slot than by the speed of the casting surface and the rate of extrusion. A higher degree of uniformity in film thickness is insured by operating with the casting drum rotating at a greater peripheral speed than the linear velocity of the polymer stream through the slot orifice; the synthetic linear polymers used in this invention are especially adaptable to this treatment. Preferably the draw down ratio is about 5:1 but ratios from 1:3 and up to 20:1 may be used effectively. From the standpoint of avoiding streaks it is desirable to use as wide a slot opening as possible, but to prevent the formation of bubbles in the film it is necessary to maintain a fairly high fluid pressure at the slot, for example, twenty pounds per square inch. The actual value of the pressure needed is dependent on the particular polymer being used, the rate of extrusion, and the temperature.

The optimum viscosity of the polymer for leveling of streaks in the air-gap is in the range between 100 to 500 poises although the same effect, to a lesser degree, is obtained with polymer having a viscosity outside this range. Usually it is practical to adjust the casting conditions in order to bring the viscosity of the polymer into this range by selecting the most favorable temperature for extrusion or by incorporating a small percentage of a high boiling solvent or plasticizer in the polymer. For the polyamides the melt viscosity can be adjusted over a fairly wide range by accurately controlling the moisture content of the polymer. The melt viscosity decreases with increase in the moisture content of the polymer.

Other film-forming synthetic linear polymers than those disclosed in the foregoing examples may be used in this invention, typical examples being polyesters, polyethers, polyacetals, polyurethanes, polythioureas, and ester-amide interpolymers and other interpolymers and mixtures of these polymers. The invention is particularly adapted to the preparation of clear films, foils, or sheets from crystalline polymers. The compositions used in making the films can contain modifying agents, e. g. plasticizers, dyes, pigments, anti-oxidants, viscosity stabilizers, and phenol-formaldehyde type resins.

Although the present process is primarily for the preparation of clear, transparent films in which streaks are especially objectionable, it is also applicable to the preparation of smooth, uniform films from polymer compositions which do not yield transparent films as, for instance, from compositions containing fillers and opacifiers.

The present process is not limited to the use of a drum since the desired results can be achieved by replacing the drum with another moving support, e. g., a continuous metal belt. It is not necessary that the moving support be a plain smooth surface since admirable results can be obtained by having a pattern or design engraved on the surface which is thereby imprinted onto the bottom side of the film during the casting operation. Very attractive products are obtained simply and cheaply in this manner.

When the process is applied to oxygen-sensitive polymers, it is desirable to surround the casting zone with an inert atmosphere as, for example, with carbon dioxide or nitrogen.

With polymers which can be handled at a temperature considerably above their melting points there is no problem of freezing in the air-gap before they strike the wheel; however, some of the synthetic linear polymers such as polyhexamethylene adipamide should not be heated many degrees above their melting points because of thermal decomposition. In using this process in the preparation of films from such polymers it is advantageous to supply additional heat to the molten stream while it is in the air-gap between the hopper and the wheel with radiant heaters, for example, by means of infra-red lamps indicated by the numeral 27 in Fig. 1.

The films obtained by this process find wide use in industry. They are, for instance, useful as photographic film base, interlayer for safety glass, transparent wrapping material, artificial leather, coating for cloth and paper, floor coating, book binding and covers, automobile tops, diaphragms for automobile fuel pumps, wall covering material, window shades, playing cards, lamp shades, currency and policy paper, battery plate separators, membranes for musical drums, strip for fabrication into straw hats and furniture seats, as a glass substitute in such uses as aircraft windshields, as bands with reinforced edges for apparel belting, suspenders, and watch straps. The present process is admirably suited for preparing first quality films, clear, smooth, uniform, and free of streaks, which are especially useful in the above mentioned fields.

As many apparently widely different embodiments of this invention may be made without departing from the spirit and scope thereof, it is to be understood that we do not limit ourselves to the specific embodiments thereof except as defined in the appended claims.

We claim:

1. Apparatus for forming films by extrusion of molten polymer, said apparatus comprising a rotatable drum having spaced peripheral grooves cut in the film-casting surface thereof, a hopper provided with an extrusion slot positioned above said drum, guides extending downwardly from said slot into said grooves, and formed to support the extruded molten film during its passage from the extrusion slot to the surface of the drum.

2. A process for forming films which comprises extruding a molten film-forming synthetic linear polymer downwardly on a moving support, the temperature of which is substantially below that of the molten polymer, through a slot orifice positioned a distance more than one-fourth inch from said support, applying heat to the molten film during its passage from the slot orifice to said support, guiding the extruded molten film only along its edges to keep it extended during its passage from the slot orifice to the moving support and moving said support at a greater speed than the linear velocity of the polymer stream extruded through the slot orifice.

3. A process for forming films which comprises extruding a molten film-forming synthetic linear polymer downwardly on a revolving drum, the temperature of which is substantially below that of the molten polymer, through a slot orifice positioned a distance more than one-fourth inch from the surface of said drum, applying heat to the molten film during its passage from the slot orifice to the surface of the drum, and guiding the extruded molten film only along its edges to keep it extended during its passage from the slot orifice to the surface of the drum.

4. A process for forming films which comprises extruding a molten film-forming synthetic linear polymer downwardly on a cooled revolving drum, the temperature of which is substantially below that of the molten polymer through a slot orifice positioned a distance more than one-fourth inch from the surface of said drum, supporting the extruded molten film only along its edges to keep it extended during its passage from the slot orifice to the surface of the drum, applying heat to the molten film during its passage from the slot orifice to the surface of the drum, and moving said drum at a greater peripheral speed than the linear velocity of the polymer stream extruded through the slot orifice.

5. The process set forth in claim 4 in which said slot orifice is positioned from three-eighths of an inch to two inches from the moving support.

6. The process set forth in claim 7 wherein the extruded film of molten polymer is displaced in the direction toward the center of the drum a distance less than one inch from a parallel vertical plane tangent to the drum.

7. A process for forming films which comprises extruding a molten film-forming synthetic linear polymer downwardly on a cooled revolving drum through a slot orifice positioned a distance more than one-fourth inch from the surface of said drum, rotating said drum at a greater peripheral speed than the linear velocity of the polymer stream extruded through the slot orifice, supporting the extruded molten film along its edges only by guiding means presenting a thin edge contacting each edge of the molten film to keep the film extended during its passage from the slot orifice to the surface of the drum, heating said guiding means, and so regulating the temperature of the drum that the polymer is solidified and cooled during its contact with the drum to a temperature of at least 60° C. below its melting point within one second from the time it first begins to solidify.

8. The process set forth in claim 4 in which said synthetic linear polymer is a polyamide.

9. The process set forth in claim 4 in which said synthetic linear polymer comprises the interpolymerization product of hexamethylenediammonium adipate and hexamethylenediammonium sebacate.

10. The process set forth in claim 4 in which said synthetic linear polymer is polyhexamethylene sebacamide.

11. The process set forth in claim 4 in which said synthetic linear polymer is polyethylene.

HENRY D. FOSTER.
ARTHUR W. LARCHAR.